(12) United States Patent
Truong Dinh et al.

(10) Patent No.: US 12,210,671 B2
(45) Date of Patent: Jan. 28, 2025

(54) ELECTRONIC APPARATUS AND CONTROLLING METHOD THEREOF USING FIRST EXTERNAL DEVICE AND SECOND EXTERNAL DEVICE

(71) Applicant: Samsung Electronics Co., Ltd., Suwon-si (KR)

(72) Inventors: Khanh Truong Dinh, Hanoi (VN); Linh Nguyen Vu, Hanoi (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/303,168

(22) Filed: Apr. 19, 2023

(65) Prior Publication Data

US 2023/0259196 A1 Aug. 17, 2023

Related U.S. Application Data

(63) Continuation of application No. PCT/KR2023/000794, filed on Jan. 17, 2023.

(30) Foreign Application Priority Data

Jan. 17, 2022 (KR) ........................ 10-2022-0006878

(51) Int. Cl.
*G06F 3/01* (2006.01)
*G06F 3/023* (2006.01)
(Continued)

(52) U.S. Cl.
CPC ................ *G06F 3/011* (2013.01); *G06F 3/14* (2013.01); *G06F 3/16* (2013.01); *G06V 40/28* (2022.01);
(Continued)

(58) Field of Classification Search
CPC ........ G06F 3/023; G06F 3/0304; G06F 3/011; G06F 3/14; G06F 3/167; G06F 3/16;
(Continued)

(56) References Cited

U.S. PATENT DOCUMENTS 9,154,218 B2 10/2015 Cha
10,015,836 B2 7/2018 Kapoor et al.
(Continued)

FOREIGN PATENT DOCUMENTS

CN 106406563 A 2/2017
CN 107889202 A 4/2018
(Continued)

OTHER PUBLICATIONS

International Search Report and Written Opinion dated Apr. 10, 2023, issued in International Patent Application No. PCT/KR2023/000794.

*Primary Examiner* — Yaron Cohen
(74) *Attorney, Agent, or Firm* — Jefferson IP Law, LLP

(57) ABSTRACT

An electronic apparatus is provided. The electronic apparatus includes a communication interface, a memory configured to store executable program and a processor coupled with the memory and configured to sense a predetermined event related to a first external device for controlling the electronic apparatus, based on the sensed predetermined event, identify at least one second external device for obtaining information related to the first external device, receive information related to the first external device from the at least one second external device, identify a user input of manipulating the first external device based on the information related to the first external device, and perform a function of the electronic apparatus based on the user input.

20 Claims, 8 Drawing Sheets

(51) Int. Cl.
*G06F 3/0354* (2013.01)
*G06F 3/14* (2006.01)
*G06F 3/16* (2006.01)
*G06V 40/20* (2022.01)

(52) U.S. Cl.
CPC ........ *G06F 3/0233* (2013.01); *G06F 3/03543* (2013.01)

(58) Field of Classification Search
CPC ........ G06F 3/0487; G06F 9/451; G06F 3/038; G06F 3/042; G06F 3/0233; G06F 3/03543; G06V 40/28; G09G 2354/00
See application file for complete search history.

(56) References Cited

U.S. PATENT DOCUMENTS

| | | | |
|---|---|---|---|
| 10,057,401 | B2 | 8/2018 | Kim et al. |
| 10,057,673 | B2 | 8/2018 | Hong et al. |
| 10,359,862 | B2 | 7/2019 | Moon et al. |
| 10,455,073 | B2 | 10/2019 | Lee et al. |
| 10,694,437 | B2 | 6/2020 | Jorgovanovic |
| 10,895,863 | B2 | 1/2021 | Kim et al. |
| 2014/0184516 | A1 | 7/2014 | Kim et al. |
| 2017/0264987 | A1* | 9/2017 | Hong .................. H04R 1/1091 |

FOREIGN PATENT DOCUMENTS

| | | |
|---|---|---|
| KR | 10-2012-0031564 A | 4/2012 |
| KR | 10-2014-0085278 A | 7/2014 |
| KR | 10-1469084 B1 | 12/2014 |
| KR | 10-2016-0017439 A | 2/2016 |
| KR | 10-2016-0120551 A | 10/2016 |
| KR | 10-2017-0082428 A | 7/2017 |
| KR | 10-2017-0088675 A | 8/2017 |
| KR | 10-2018-0099182 A | 9/2018 |
| KR | 10-1934930 B1 | 1/2019 |
| KR | 10-1949373 B1 | 2/2019 |
| WO | 2020/117404 A1 | 6/2020 |

* cited by examiner

FIG. 5
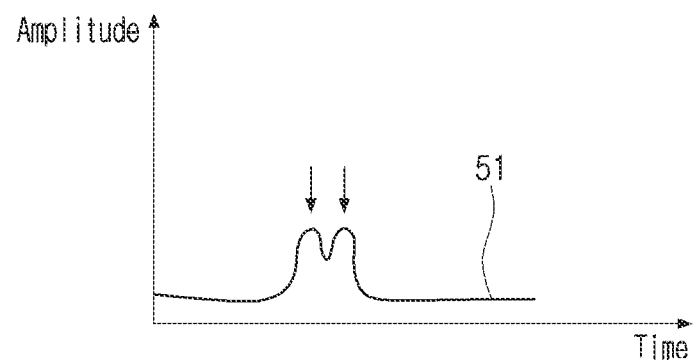
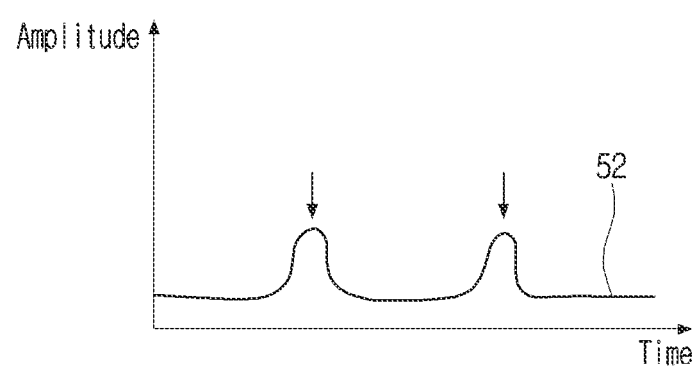

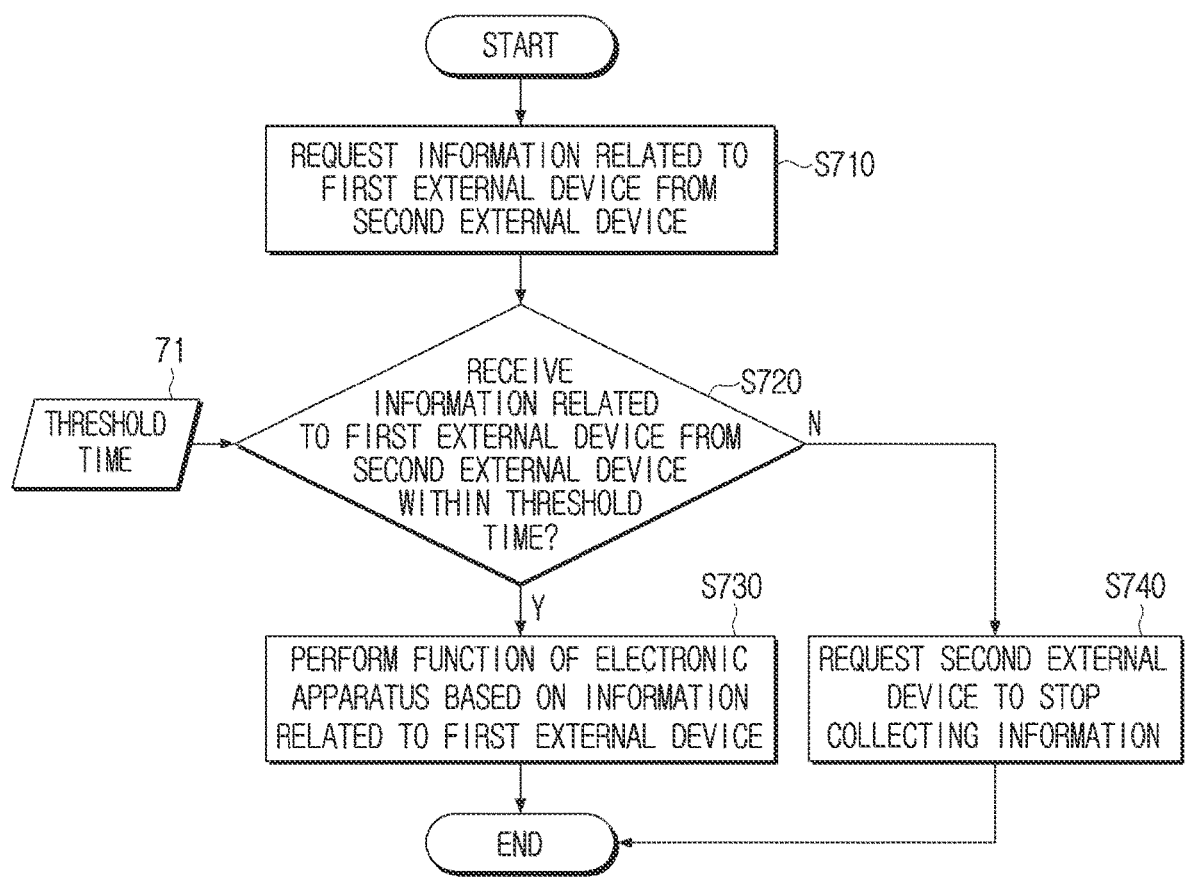

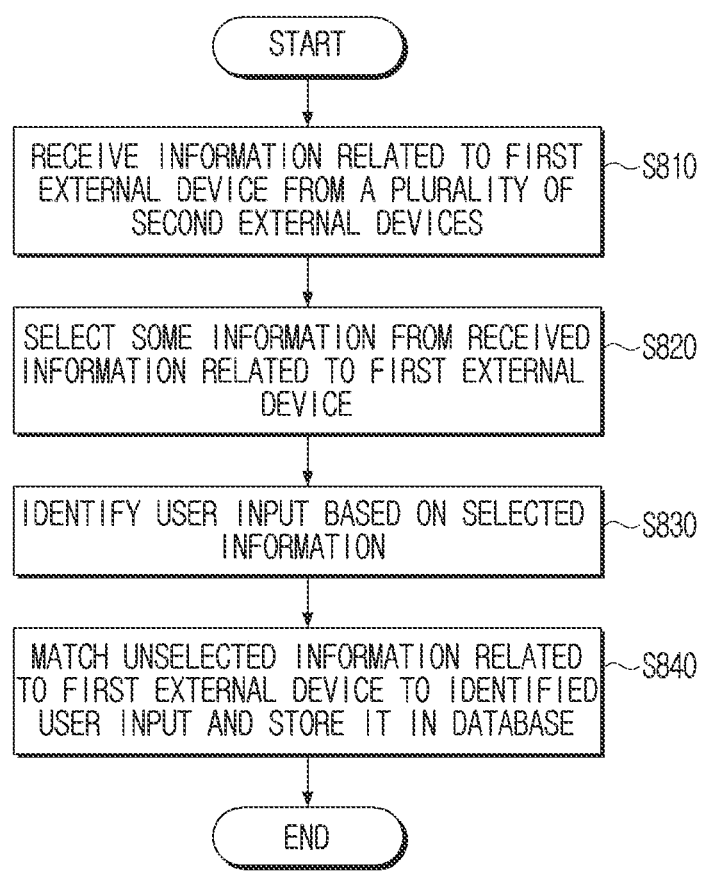

ELECTRONIC APPARATUS AND CONTROLLING METHOD THEREOF USING FIRST EXTERNAL DEVICE AND SECOND EXTERNAL DEVICE

CROSS-REFERENCE TO RELATED APPLICATION(S)

This application is a continuation application, claiming priority under § 365 (c), of an International application No. PCT/KR2023/000794, filed on Jan. 17 2023, which is based on and claims the benefit of a Korean patent application number 10-2022-0006878, filed on Jan. 17, 2022, in the Korean Intellectual Property Office, the disclosure of which is incorporated by reference herein in its entirety.

FIELD

This disclosure relates to an electronic apparatus and a controlling method thereof. More particularly, the disclosure relates to an electronic apparatus that identifies a user input through an external device and a controlling method thereof.

DESCRIPTION OF THE RELATED ART

With the development of electronic technology, a technology for controlling another electronic apparatus through an electronic apparatus is used. For example, a user may control a smartphone by manipulating a stylus pen. Alternatively, a user may control a tablet personal computer (PC) using a wearable device.

Meanwhile, while a user controls another electronic apparatus through an electronic apparatus, a situation in which the electronic apparatus is no longer usable may occur. For example, a communication connection between the electronic apparatus and another electronic apparatus may be released, or a battery of the electronic apparatus may be low. In this case, the user is no longer able to continuously control another electronic apparatus through the electronic apparatus.

Accordingly, there is a need for a technology that allows a user to control another electronic apparatus through an electronic apparatus more conveniently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to identifying a user input by obtaining information related to an external device manipulated by a user through another external device. The technical tasks of the disclosure are not limited to the above-described technical tasks, and other technical tasks not mentioned herein may be clearly understood by those skilled in the art pertaining to the technical field of the disclosure based on the following features.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface, a memory configured to store executable program and a processor coupled with memory and configured to sense a predetermined event related to a first external device for controlling the electronic apparatus, based on the sensed predetermined event, identify at least one second external device for obtaining information related to the first external device, receive information related to the first external device from the at least one second external device, identify a user input of manipulating the first external device based on the information related to the first external device, and perform a function of the electronic apparatus based on the user input.

The predetermined event includes an event in which a communication connection between the electronic apparatus and the first external device is released and an event in which a remaining battery level of the first external device becomes less than a threshold value.

The processor may be configured to identify a detection resource included in a plurality of external devices communicatively connected to the electronic apparatus and identify the at least one second external device including a detection resource corresponding to the information related to the first external device from among the plurality of external devices.

The processor may be configured to obtain a priority of a plurality of types of information included in the information related to the first external device and based on there being a plurality of the at least one second external device, identify a second external device including a detection resource corresponding to a type having the highest priority from among the at least one second external device.

The processor may be configured to, based on there being a plurality of the at least one second external device, identify a second external device located closest to the first external device from among the at least one second external device.

The information related to the first external device includes information on sound generated while the user manipulates the first external device, information on an image capturing the first external device, information on a movement of the first external device, information on light output from the first external device, and information on an odor generated from the first external device, and the processor may be configured to identify the user input by comparing the information related to the first external device with information pre-stored in the memory.

The processor may be configured to, based on the information related to the first external device not being received from the second external device within a threshold time, control the communication interface to transmit a control signal for controlling the second external device to stop obtaining the information related to the first external device to the second external device.

The apparatus further includes a display, and the processor may be further configured to, based on the predetermined event being sensed, control the display to output a notification message notifying disconnection of communication between the electronic apparatus and the first external device and start of collection of information related to the first external device.

In accordance with another aspect of the disclosure, a method performed by an electronic apparatus is provided. The method includes, sensing a predetermined event related to a first external device for controlling the electronic apparatus, based on the sensing of the predetermined event, identifying at least one second external device for obtaining information related to the first external device, receiving information related to the first external device from the at least one second external device, identifying a user input of manipulating the first external device based on the information related to the first external device, and performing a function of the electronic apparatus based on the user input.

The predetermined event includes an event in which a communication connection between the electronic apparatus and the first external device is released and an event in which a remaining battery level of the first external device becomes less than a threshold value.

The identifying at least one second external device includes identifying a detection resource included in a plurality of external devices communicatively connected to the electronic apparatus, and identifying the at least one second external device including a detection resource corresponding to the information related to the first external device from among the plurality of external devices.

The identifying at least one second external device includes obtaining a priority of a plurality of types of information included in the information related to the first external device, and based on there being a plurality of the at least one second external device, identifying a second external device including a detection resource corresponding to a type having the highest priority from among the at least one second external device.

The identifying at least one second external device includes, based on there being a plurality of the at least one second external device, identifying a second external device located closest to the first external device from among the at least one second external device.

The information related to the first external device includes information on sound generated while the user manipulates the first external device, information on an image capturing the first external device, information on a movement of the first external device, information on light output from the first external device, and information on an odor generated from the first external device, and the identifying a user input includes identifying the user input by comparing the information related to the first external device with information pre-stored in the memory.

The method further includes, based on the information related to the first external device not being received from the second external device within a threshold time, transmitting a control signal for controlling the second external device to stop obtaining the information related to the first external device to the second external device.

The method further includes, based on the predetermined event being sensed, outputting a notification message notifying disconnection of communication between the electronic apparatus and the first external device and start of collection of information related to the first external device.

The solutions to the tasks of the disclosure are not limited to the above-described solutions, and solutions not mentioned will be clearly understood by those skilled in the art to which the disclosure pertains with reference to the disclosure and the accompanying drawings.

According to the above-described various embodiments, the electronic apparatus may identify a user input by obtaining information regarding an external device manipulated by the user through another external device. Accordingly, the user may control the electronic apparatus continuously through the external device.

Other aspects, advantages, and salient features of the disclosure will become apparent to those skilled in the art based on the following detailed description, which, taken in conjunction with the annexed drawings, discloses various embodiments of the disclosure.

BRIEF DESCRIPTION OF THE DRAWINGS

The above and other aspects, features, and advantages of certain embodiment of the disclosure will be more apparent from the following description taken in conjunction with the accompanying drawings, in which:

FIG. 5 is a view provided to explain a method of identifying a user input according to an embodiment of the disclosure;

FIG. 7 is a view provided to explain a controlling method of an electronic apparatus according to an embodiment of the disclosure; and FIG. 8 is a view provided to explain a controlling method of an electronic apparatus according to an embodiment of the disclosure.

Throughout the drawings, it should be noted that like reference numbers are used to depict the same or similar elements, features, and structures.

DETAILED DESCRIPTION

Figure 1:
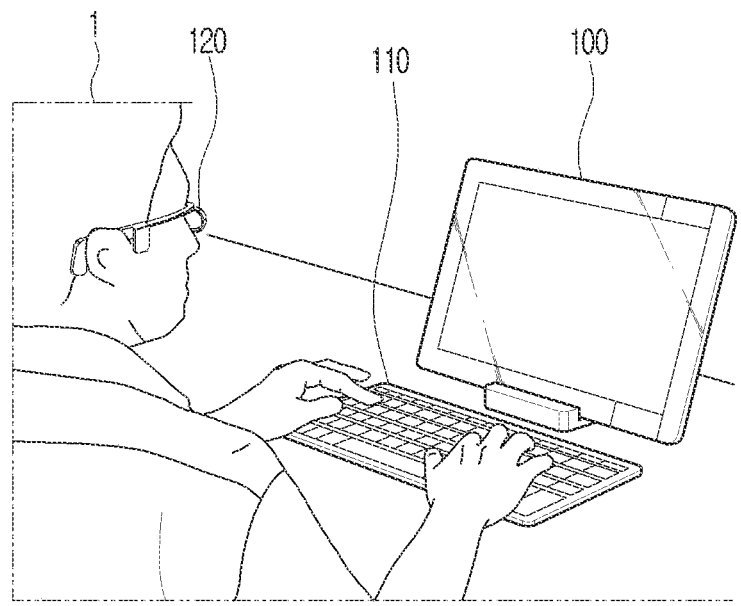
FIG. 1 is a view provided to explain a controlling method of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to specific embodiments, but includes all modifications, equivalents, and substitutions without departing from the scope and spirit of the disclosure. In case that it is decided that the detailed description of the known art related to the disclosure may obscure the gist of the disclosure, a detailed description thereof will be omitted.

Terms 'first', 'second', and the like, may be used to describe various components, but the components are not to be construed as being limited by these terms. The terms are used only to distinguish one component from another component.

It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments provided in the disclosure. In addition, in the drawings, portions unrelated to the description are omitted to clearly describe the disclosure, and similar portions are denoted by similar reference numerals throughout the specification.

FIG. 1 is a view provided to explain a controlling method of an electronic apparatus according to an embodiment of the disclosure.

Referring to FIG. 1, a user 1 may control an electronic apparatus 100 by manipulating a first external device 110. The electronic apparatus 100 may be a tablet PC, and the first external device 110 may be a keyboard. The electronic apparatus 100 may perform a function based on a command of the user 1, which is input through the first external device 110. For example, the electronic apparatus 100 may display a text corresponding to keys of the first external device 110 pressed by the user 1.

The electronic apparatus 100 may sense a predetermined event related to the first external device 110. The predetermined event may include an event in which a communication connection between the electronic apparatus 100 and the first external device 110 is released. In addition, the predetermined event may include an event in which the remaining battery level of the first external device 110 becomes less than a threshold value. When the predetermined event occurs, the electronic apparatus 100 may no longer obtain an input of the user 1 from the first external device 110. Accordingly, when the user 1 is no longer able to control the electronic apparatus 100 through the first external device 110, the user 1 may feel inconvenience.

In order to prevent the above problem, the electronic apparatus 100 may obtain an input of the user 1 who manipulates the first external device 110 through a second external device 120. The second external device 120 may be smart glasses worn by the user 1. The second external device 120 may obtain information related to the first external device 110. The information related to the first external device 110 may include information for identifying an input of the user 1 who manipulates the first external device 110. For example, the information related to the first external device 110 may include at least one of information on sound generated while the user 1 manipulates the first external device 110, information on an image capturing surroundings of the first external device 110, information on a movement of the first external device 110, information on light output from the first external device 110, and information on an odor generated from the first external device 110.

According to an embodiment, the second external device 120 may obtain an image capturing a hand of the user 1 who manipulates the first external device 110 through a camera. Subsequently, the second external device 120 may transmit the obtained image to the electronic apparatus 100. The electronic apparatus 100 may identify a user input by analyzing the received image. For example, the electronic apparatus 100 may identify keys pressed by the user 1. The electronic apparatus 100 may perform a function corresponding to the identified keys. Accordingly, the user 1 may control the electronic apparatus 100 continuously without replacing the first external device 110 with another external device.

Figure 2:
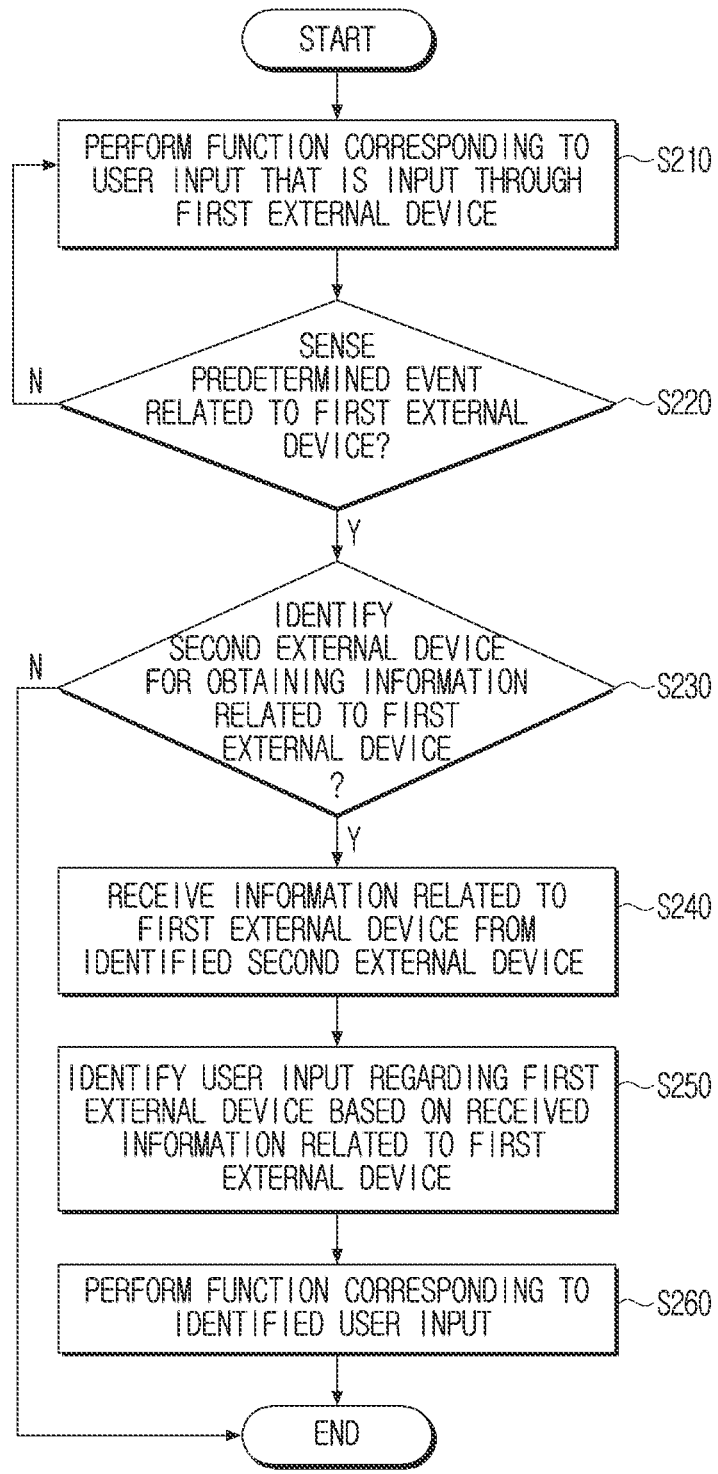
FIG. 2 is a block diagram illustrating configuration of an electronic apparatus according to an embodiment of the disclosure.

FIG. 2 is a block diagram illustrating configuration of an electronic apparatus according to an embodiment of the disclosure.

Referring to FIG. 2, the electronic apparatus 100 may perform a function corresponding to a user input that is input through the first external device in operation S210. For example, the electronic apparatus 100 may display texts corresponding to keys of the first external device, which were pressed by the user, as illustrated in FIG. 1.

The electronic apparatus 100 may identify whether a predetermined event related to the first external device is sensed in operation S220. For example, when a communication connection with the first external device is released, the electronic apparatus 100 may identify that the predetermined event is sensed. When it is identified that the predetermined event related to the first external device is sensed in operation S220-Y, the electronic apparatus 100 may determine whether a second external device for obtaining information related to the first external device is identified in operation S230. For example, an external device including a detection resource capable of obtaining information related to the first external device from among a plurality of external devices connected to the electronic apparatus 100 may be identified as the second external device. When it is identified that the predetermined event related to the first external device is not sensed in operation S220-N, the electronic apparatus 100 may continuously perform a function corresponding to a user input that is input through the first external device in operation S210.

When the second external device is identified in operation S230-Y, the electronic apparatus 100 may receive information related to the first external device from the identified second external device in operation S240. The information related to the first external device may include at least one of information on sound generated while the user manipulates the first external device, information on an image capturing the first external device, information on a movement of the first external device, information on light output from the first external device, and information on an odor generated from the first external device.

The electronic apparatus 100 may identify a user input for the first external device based on the information related to the first external device, which is received from the identified second external device in operation S250. For example, the electronic apparatus 100 may receive information on sound generated while the user manipulates the first external device, from the second external device. In this case, the electronic apparatus 100 may identify a user input corresponding to the received sound information by comparing the received sound information with pre-stored sound information. For example, the received sound information may correspond to a user input of double-clicking the first external device. When a user input is identified, the electronic apparatus 100 may perform a function corresponding to the identified user input in operation S260. For example, the electronic apparatus 100 may execute a first application stored in the electronic apparatus 100 based on the user input of double-clicking the first external device.

In the above description, a user input for the first external device is identified using only one information, that is, information on sound generated while the user manipulates the first external device, but the disclosure is not limited thereto. In other words, the electronic apparatus 100 may identify a user input for the first external device by combining more than two pieces of information related to the first external device.

According to an embodiment, the electronic apparatus 100 may receive image information and sound information related to the first external device from the second external device, and identify a user input for the first external device based on the received image information and sound information.

For example, the electronic apparatus 100 may receive, from the second external device, image information indicating keys on which the user places his or her fingers in the keyboard that is the first external device. Subsequently, the electronic apparatus 100 may receive information on sound indicating whether the keys of the keyboard that is the first external device are pressed by the user. In this case, the image information and the sound information may include information on an image acquisition time and information on sound acquisition time. Accordingly, the electronic apparatus 100 may identify a user input for the first external device by identifying whether a specific key of the keyboard that is the first external device is pressed by the user.

In another example, the electronic apparatus 100 may receive image information indicating where the user places a mouse pointer on the screen displayed on the display of the electronic apparatus 100 using the mouse that is the first external device, from the second external device. In addition, the electronic apparatus 100 may receive sound information indicating that the user double-clicked a button of the mouse that is the first external device, from the second external device. In this case, the electronic apparatus 100 may identify a user input for the first external device by identifying whether the user has double-clicked the pointer of the mouse that is the first external device while placing it at which area of the screen displayed on the display based on the combination of image information and sound information obtained at the same time.

In addition to the above-described embodiment, the embodiment of identifying a user input for the first external device by combining more than two pieces of information related to the first external device, which are received from the second external device, can be implemented in various ways. Meanwhile, in the operation of S250, a user input for the first external device is identified by the electronic apparatus 100, but this is only an example. A user input for the first external device may be identified by the second external device. For example, the second external device may identify a user input based on information regarding the first external device, and transmit information regarding the identified user input to the electronic apparatus 100. The electronic apparatus 100 may perform a function corresponding to the user input based on the received information regarding the user input.

The electronic apparatus 100 may operate in a first mode or in a second mode. The first mode (or a direct mode) means a mode in which the electronic apparatus 100 receives information regarding a user input from an external device (i.e., the first external device) through which a user input is obtained. The second mode (or an indirect mode) means a mode in which the electronic apparatus 100 receives information regarding a user input from another external device (i.e., the second external device) that is not the external device through which a user input is obtained.

In the operation of S210, the electronic apparatus 100 may operate in the first mode. While operating in the first mode, when a predetermined event related to the first external device is sensed in operation S220-Y, the electronic apparatus 100 may enter the second mode. While operating in the second mode, when an event opposite to the predetermined event (e.g., an event in which a communication connection between the electronic apparatus 100 and the first external device is resumed or the remaining battery level of the first external device becomes equal to or greater than a threshold value) occurs, the electronic apparatus 100 may enter the first mode again.

Figure 3:
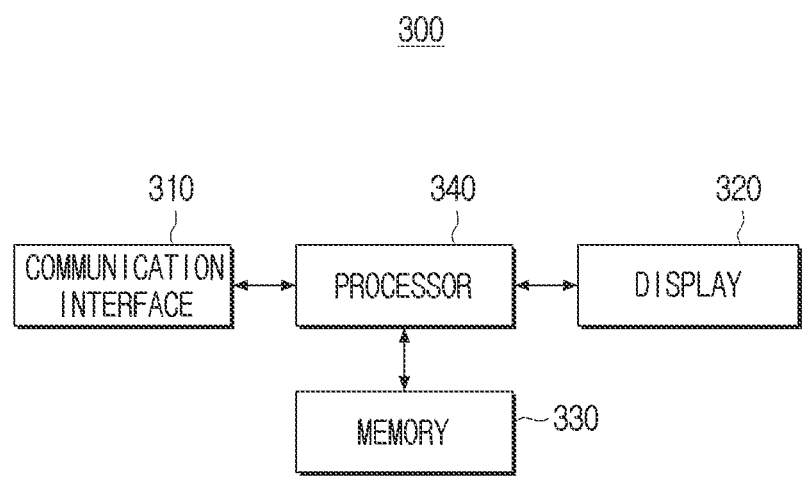
FIG. 3 is a block diagram illustrating configuration of an electronic apparatus according to an embodiment of the disclosure.

FIG. 3 is a block diagram illustrating configuration of an electronic apparatus according to an embodiment of the disclosure.

Referring to FIG. 3, an electronic apparatus 300 may include a communication interface 310, a display 320, a memory 330, and a processor 340. The communication interface 310 includes at least one communication circuit, and may perform communication with various types of external devices or external servers. For example, the communication interface 310 may receive information related to the first external device from the second external device 120.

The communication interface 310 may include at least one of near field communication (NFC) module, Bluetooth module, wireless-fidelity (Wi-Fi) module, Wi-Fi Direct module, Cellular communication module, 3rd Generation (3G) mobile communication module, 4th Generation (4G) mobile communication module, 4th Generation Long Term Evolution (LTE) communication module, 5th Generation (5G) mobile communication module, or Wired Ethernet.

The display 320 may display various information under the control of the processor 340. For example, the display 320 may output a notification message notifying the occurrence of a predetermined event related to the first external device. Alternatively, the display 320 may output a notification message informing that a service is provided through the second external device. The display 320 may be implemented as Liquid Crystal Display (LCD) panel, Organic Light Emitting Diodes (OLED), etc., but the display 320 may also be implemented as a flexible display, a transparent display, etc. However, the display 320 according to an embodiment is not limited to a specific type.

The memory 330 may store commands or data related to the Operating System (OS) for controlling the overall operations of the components of the electronic apparatus 300 and to the components of the electronic apparatus 300. For example, the memory 330 may store information regarding an action of the first external device, information related to the first external device, a detection resource for obtaining information related to the first external device, and a priority corresponding to the information related to the first external device. At least part of the information regarding an action of the first external device, the information related to the first external device, the detection resource for obtaining information related to the first external device, and the priority corresponding to the information related to the first external device may be matched to each other and stored in database. The action of the first external device may include an action that occurs while the user manipulates the first external device.

The memory 330 may store information regarding a neural network model for identifying a user input. For example, the neural network model may be trained to identify a user input based on information related to the first external device. In addition, the memory 330 may store information regarding various image processing algorithms. For example, the memory 330 may store information regarding an image analysis algorithm for identifying a user input based on a user gesture included in an image. The memory 330 may be implemented as a non-volatile memory (e.g., hard disk, Solid state drive (SSD), flash memory), a volatile memory, etc.

The processor 340 may be electrically connected to the memory 330 and control the overall functions and operations of the electronic apparatus 300. The processor 340 may perform various operations by executing at least one instruction stored in the memory 330. For example, the processor 340 may identify whether a predetermined event related to the first external device has occurred. In an example, when a connection between the communication interface 310 and the first external device is released, the processor 340 may identify that a predetermined event related to the first external device has occurred. In another example, the processor 340 may receive information regarding the remaining battery level of the first external device through the communication interface 310. When the remaining battery level of the first external device is less than a threshold value, the processor 340 may identify that a predetermined event related to the first external device has occurred.

When a predetermined event related to the first external device occurs, the processor 340 may identify the second external device in order to obtain information related to the first external device. The processor 340 may obtain information regarding an action of the first external device based on the information regarding the first external device. For example, the information regarding the first external device may include at least one of the product information, specification information and type information of the first external device. For instance, when the first external device is a mouse, the action of the first external device may include a click.

The processor 340 may obtain information regarding an action of the first external device. The information related to the action of the first external device may include information for the first external device to identify an action. For example, when there is a movement of the first external device, the information related to the action of the first external device may include an electronic signal output by the first external device, information on an image capturing the first external device, and information on the movement of the first external device. The information related to the action of the first external device may be pre-stored in the memory 330. For example, the memory 330 may store a matching table in which an action and information related to the action are matched.

The processor 340 may identify the second external device including a detection resource capable of obtaining information related to the action of the first external device from among a plurality of external devices communicatively connected to the electronic apparatus 300. The memory 330 may store a matching table in which specific information and a detection resource necessary to obtaining the specific information are matched. The processor 340 may identify a detection resource necessary to obtain information related to the action of the first external device based on the matching table. Subsequently, the processor 340 may identify an external device including the identified detection resource from among the plurality of external devices as the second external device.

The processor 340 may identify the second external device based on a priority corresponding to the information related to the action of the first external device. There may be a plurality of second external devices including a detection resource capable of obtaining the information related to the action of the first external device. For example, information related to 'a click action' of the first external device may include sound information and image information. The plurality of second external devices may include the first device including a microphone capable of obtaining sound information and the second device including a camera capable of obtaining image information. The priority of sound information may be a first priority, and the priority of image information may be a second priority higher than the first priority. In this case, the processor 340 may select the second device including a camera capable of obtaining image information having a higher priority between sound information and image information as a device for obtaining information related to an action of the first external device.

If there are a plurality of second external devices capable of obtaining information regarding an action of the first external device, the processor 340 may select a device located closest to the first external device from among the plurality of second devices as a device for obtaining information related to an action of the first external device.

The processor 340 may identify a user input for the first external device (or an action of the first external device) based on the information related to the first external device, which is received from the second external device. The processor 340 may identify a user input by comparing the information related to the first external device and various information corresponding to the stored user input. For example, the processor 340 may obtain sound information from the second device. The processor 340 may identify sound information whose similarity to the obtained sound information among the sound information stored in the memory 330 is equal to or greater than a predetermined value. In addition, the processor 340 may identify a user input corresponding to the identified sound information.

When the operation mode of the electronic apparatus 300 is converted, the processor 340 may control the display 320 to output a notification message related to the conversion of the operation mode. For example, as a communication connection between the electronic apparatus 300 and the first external device is released, the operation mode of the electronic apparatus 300 may be converted from the first mode to the second mode. In this case, the processor 340 may control the display 320 to output a notification message (e.g., "Device A has just lost connection") indicating disconnection of the communication connection between the electronic apparatus 300 and the first external device. In addition, the processor 340 may control the display 320 to output a notification message notifying the start of the collection of the information related to the first external device (e.g., "The device B will support to detect A's action to control Task continuing!").

Meanwhile, if the information related to the first external device is not received from the second external device within a threshold time, the processor 340 may control the communication interface 310 to transmit a control signal requesting to stop the information collection of the second external device to the second external device. Accordingly, the second external device may stop the operation for obtaining the information related to the first external device.

Figure 4:
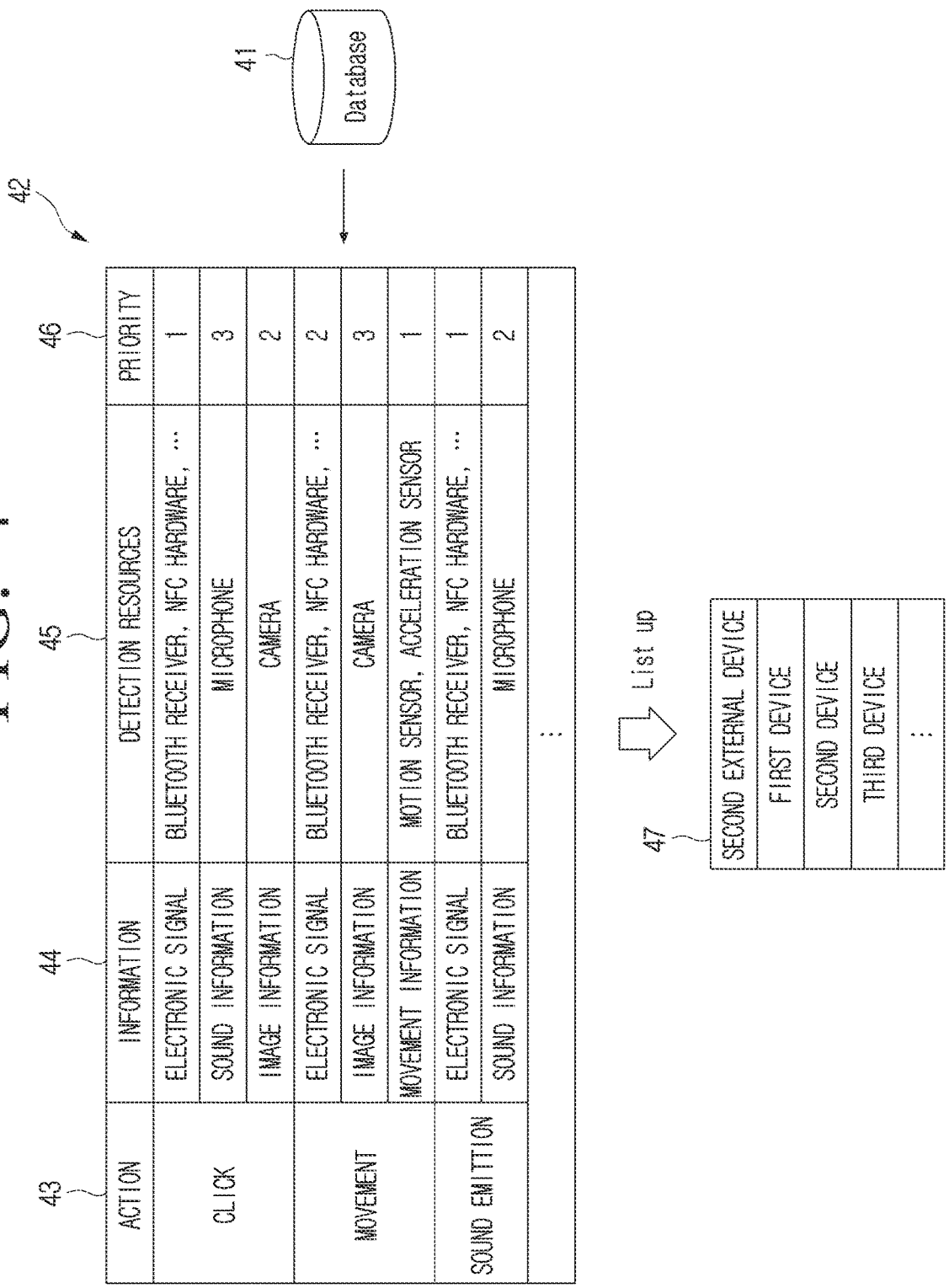
FIG. 4 is a view provided to explain a method of identifying a second external device according to an embodiment of the disclosure.

FIG. 4 is a view provided to explain a method of identifying a second external device according to an embodiment of the disclosure.

Referring to FIG. 4, database 41 stored in the memory of the electronic apparatus 100 may store a matching table 42 in which an action 43 of a predetermined device, information 44 related to the action 43, a detection resource 45 for obtaining the information 44 and a priority 46 corresponding to the information 44 are matched.

For example, the action 43 may include a click action, a movement action and a sound emission action. However, this is only an example, and the action 43 may include a light emission action, a color emission action, an odor emission action, a heat emission action, an ultrasonic emission action, and an infrared emission action. The information 44 corresponding to the click action may include an electronic signal, sound information and image information. The information 44 corresponding to the movement action may include an electronic signal, image information and movement information. The information 44 corresponding to the sound emission action may include an electronic sound and sound information.

The detection resource 45 for obtaining an electronic signal may include a Bluetooth receiver, an NFC hardware and a Bluetooth transmitter. The detection resource 45 for obtaining sound information may include a microphone. The detection resource 45 for obtaining image information may include a camera. The detection resource 45 for obtaining movement information may include a motion sensor and an acceleration sensor.

The priority corresponding to an electronic signal related to a click action may be the first priority. The priority corresponding to sound information related to a click action may be the third priority. The priority of image information related to a click action may be the second priority. The priority corresponding to an electronic signal related to a movement action may be the second priority. The priority corresponding to image information related to a movement action may be the third priority. The priority corresponding to movement information related to a movement action may be the first priority. The priority corresponding to an electronic signal related to a sound emission action may be the first priority. The priority corresponding to sound information related to a sound emission action may be the second priority.

The electronic apparatus 100 may identify the second external device for obtaining information related to the first external device based on the matching table 42. The electronic apparatus 100 may obtain information related to the action of the first external device based on the information regarding the first external device. The information related to the action of the first external device may include information serving as a clue for identifying the action of the first external device. For example, when the first external device is a mouse, the electronic apparatus 100 may identify sound information and image information as clues for identifying a click action of the mouse. The electronic apparatus 100 may identify a detection resource included in a plurality of external devices connected to the electronic apparatus 100. For example, the electronic apparatus 100 may identify a camera included in the first device (a smart glasses) and a microphone included in the second device (a smart watch). The electronic apparatus 100 may identify the second external device including a detection resource for obtaining information related to the first external device from among a plurality of external devices. For example, when the information related to the first external device is image information and sound information, the electronic apparatus 100 may identify the first device (a smart glasses) including a camera capable of obtaining image information and the second device (a smart watch) including a microphone capable of obtaining sound information as the second external devices.

The electronic apparatus 100 may obtain a list 47 including at least one second external device. The at least one second external device may be arranged according to a priority. For example, the list 47 may include the first device, the second device, and the third device. The priority of the first device may be higher than that of the second device, and the priority of the second device may be higher than that of the third device.

The electronic apparatus 100 may obtain information related to the first external device through the second external device having a higher priority from among the at least one second external device included in the list 47. Alternatively, the electronic apparatus 100 may receive information related to the first external device from each of the plurality of second external devices. For example, the electronic apparatus 100 may receive image information from the first device, and receive sound information from the second device.

The electronic apparatus 100 may update the list 47. For example, while the electronic apparatus 100 receives information related to the first external device from the first device, a communication connection between the electronic apparatus 100 and the first device may be released. In this case, the electronic apparatus 100 may newly identify the second external device and update the list 47.

FIG. 5 is a view provided to explain a method of identifying a user input according to an embodiment of the disclosure.

Referring to FIG. 5, the electronic apparatus 100 may store sound information for identifying a user input. The electronic apparatus 100 may store first sound information 51 and second sound information 52. For example, the first sound information 51 may correspond to a click action, and the second sound information 52 may correspond to a double click action.

The electronic apparatus 100 may receive sound information that occurs in the process where a user manipulates the first external device from the second external device. By determining a similarity between the received sound information and the stored sound information, the electronic apparatus 100 may identify a user input corresponding to the received sound information. The electronic apparatus 100 may identify sound information most similar to the received sound information among the stored sound information and identify an action corresponding to the identified sound information as a user input. For example, when the first sound information 51 among the stored sound information is most similar to the received round information, the electronic apparatus 100 may determine that a user input is a 'a click action.' Alternatively, when the second sound information 52 among the stored sound information is most similar to the received sound information, the electronic apparatus 100 may determine that a user input is 'a double click action.'

Figure 6:
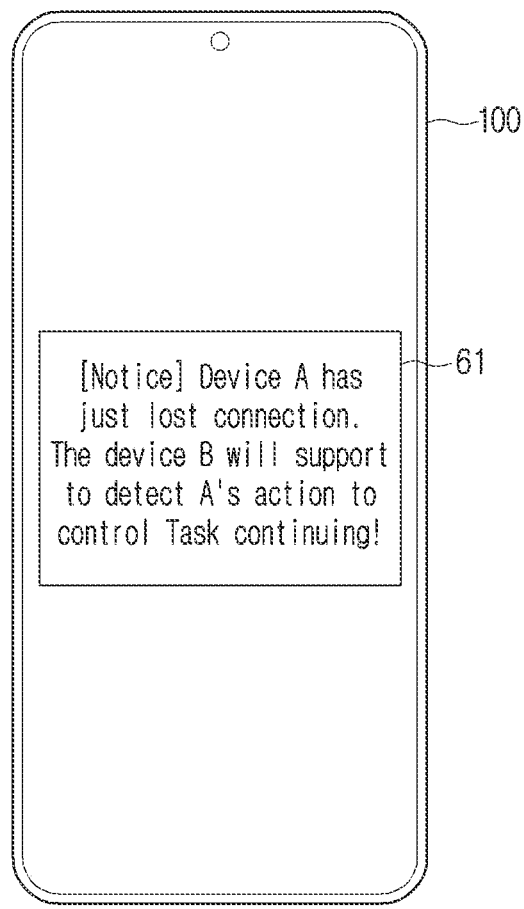
FIG. 6 is a view provided to explain a method of outputting notification information by an electronic apparatus according to an embodiment of the disclosure.

FIG. 6 is a view provided to explain a method of outputting notification information by an electronic apparatus according to an embodiment of the disclosure.

Referring to FIG. 6, the electronic apparatus 100 may display a notification message 61 that a connection with apparatus A is released and an action of the apparatus A is detected through apparatus B. The electronic apparatus 100 may output the notification information when the operation mode of the electronic apparatus 100 is switched. For example, while the electronic apparatus 100 operates in the first mode (i.e., direct mode), a communication connection between the electronic apparatus 100 and the apparatus A may be released. The electronic apparatus 100 may identify the apparatus B, and enter the second mode (i.e., indirect mode). In this case, the electronic apparatus 100 may display the notification message 61.

FIG. 7 is a view provided to explain a controlling method of an electronic apparatus according to an embodiment of the disclosure.

Referring to FIG. 7, the electronic apparatus 100 may request information related to the first external device from the second external device in operation S710. When a predetermined event related to the first external device is sensed, the electronic apparatus 100 may enter the second mode and obtain information related to the first external device through the second external device.

The electronic apparatus 100 may identify whether information related to the first external device is received from the second external device within a threshold time 71 in operation S720. When the information related to the first external device is received from the second external device within the threshold time 71 in operation S720-Y, the electronic apparatus 100 may perform the function of the electronic apparatus 100 based on the information related to the first external device in operation S730. When the information related to the first external device is not received from the second external device within the threshold time 71 in operation S720-N, the electronic apparatus 100 may request the second external device to stop collecting the information in operation S740.

The electronic apparatus 100 may calculate the threshold time 71 based on at least one of history information of a user input and information on user habits. The history information of a user input and the information on user habits may be stored in the memory.

FIG. 8 is a view provided to explain a controlling method of an electronic apparatus according to an embodiment of the disclosure.

Referring to FIG. 8, the electronic apparatus 100 may receive information related to the first external device from a plurality of second external devices in operation S810. For example, the electronic apparatus 100 may obtain first sound information and first movement information from a first device including a first microphone and a first motion sensor. In addition, the electronic apparatus 100 may obtain second sound information and second movement information from a second device including a second microphone and a second motion sensor.

The electronic apparatus 100 may select some information among the received information related to the first external device in operation S820. When the same type of information is received from the plurality of second external devices, the electronic apparatus 100 may select information based on performance of detection resources included in the plurality of second external devices. The electronic apparatus 100 may select information obtained by a detection resource having the best performance. For example, the first microphone may have the higher performance than the second microphone, and the first motion sensor may have the lower performance that the second motion sensor. In this case, the electronic apparatus 100 may select the first sound information between the first sound information and the second sound information. In addition, the electronic apparatus 100 may select the second movement information between the first movement information and the second movement information.

The electronic apparatus 100 may identify a user input based on the selected information in operation S830. For example, the electronic apparatus 100 may identify a user input based on the first sound information and the second movement information. Accordingly, the accuracy of identifying a user input by the electronic apparatus 100 may be enhanced.

The electronic apparatus 100 may match unselected information related to the first external device with the identified user input and store it in the database in operation S840. For example, the electronic apparatus 100 may match the first movement information and the second sound information with the identified user input and store it in the database. The electronic apparatus 100 may identify a user input using the information related to the first external device stored in the database. Accordingly, the accuracy of identifying a user input by the electronic apparatus 100 may be enhanced.

Meanwhile, in the above description, an embodiment where on the premise of a system including the electronic apparatus 100, the first external device and the second external device, the electronic apparatus 100 receives information related to the first external device from the second external device and identifies a user input of manipulating the first external device based on the received information, but the disclosure is not limited thereto.

Specifically, the electronic apparatus 100 according to an embodiment may identify a user input of manipulating the first external device based on the information obtained by the electronic apparatus 100, not the information received from the second external device, and may identify a user input of manipulating the first external device using the information received from the second external device together with the information obtained by the electronic apparatus 100.

In other words, the electronic apparatus 100 according to an embodiment and the second external device may be implemented as one device, or even when the electronic apparatus 100 and the second external device are implemented as separate devices, the electronic apparatus 100 may identify a user input of manipulating the first external device based on at least one of the information received from the second external device and the information obtained by the electronic apparatus 100.

For example, the electronic apparatus 100 may receive sound information that is generated in the process in which a user manipulates the first external device through a component included in the electronic apparatus 100, not a component included in a separate second external device, and identify a user input of manipulating the first external device based on the sound information. More specifically, for example, when the electronic apparatus 100 is a notebook computer and the first external device is a wireless mouse connected to the notebook computer, even if a communication connection with the mouse is terminated, the notebook computer may identify a click sound of the mouse through a microphone included in the notebook computer.

Meanwhile, the above-described various embodiments may be implemented in a recording medium that is readable by a computer or a similar device using software, hardware of a combination thereof. In some cases, the embodiments described in the disclosure may be implemented by the processor itself. According to software implementation, the embodiments such as procedures and functions described in the disclosure may be implemented by separate software modules. Each of the software modules may perform one or more functions and operations described in the disclosure.

Meanwhile, the computer instructions for performing the processing operation of the display apparatus according to the above-described various embodiments of the disclosure may be stored in a non-transitory computer-readable medium. The computer instructions stored in such a non-transitory computer-readable medium may cause a specific device to perform the processing operation according to the above-described various embodiments when they are executed by the processor.

The non-transitory computer readable medium is not a medium that stores data for a while, such as a register, a cache, a memory, or the like, but means a medium that semi-permanently stores data and is readable by an apparatus. Specifically, the non-transitory readable medium may include a compact disc (CD), a digital versatile disc (DVD), a hard disc, a Blu-ray disc, a universal serial bus (USB), a memory card, a read only memory (ROM), or the like.

Meanwhile, the machine-readable storage medium may be provided in the form of non-transitory storage medium. Here, the term 'non-transitory storage medium' means that it does not contain a signal (e.g., electromagnetic wave) and is tangible, but does not distinguish between semi-permanent or temporary storage of data in the storage medium. For example, the 'non-transitory storage medium' may include a buffer in which the data is temporarily stored.

According to an embodiment, the methods according to the various embodiments disclosed in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PlayStore™) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communication interface;
memory storing one or more computer programs; and
one or more processors communicatively coupled to the communication interface and the memory,
wherein the one or more computer programs include computer-executable instructions that, when executed by the one or more processors individually or collectively, cause the electronic apparatus to:
sense a predetermined event related to a first external device for controlling the electronic apparatus, the first external device being a first type device different from a type of device of the electronic apparatus,
based on the sensed predetermined event, identify at least one second external device for obtaining information related to the first external device, the at least one second external device being at least one second type device different from the first type device of the first external device and the type of device of the electronic apparatus,
receive information related to the first external device from the at least one second external device, the information related to the first external device including information detected by the at least one second external device while a user manipulates the first external device,
identify a user input of manipulating the first external device based on the information related to the first external device, and
perform a function of the electronic apparatus based on the user input.

2. The electronic apparatus of claim 1, wherein the predetermined event includes an event in which a communication connection between the electronic apparatus and the first external device is released and an event in which a remaining battery level of the first external device becomes less than a threshold value.

3. The electronic apparatus of claim 1, wherein the one or more computer programs further include computer-executable instructions that, when executed by the one or more processors individually or collectively, cause the electronic apparatus to:
identify a detection resource included in a plurality of external devices communicatively connected to the electronic apparatus; and
identify the at least one second external device including a detection resource corresponding to the information related to the first external device from among the plurality of external devices.

4. The electronic apparatus of claim 3, wherein the one or more computer programs further include computer-executable instructions that, when executed by the one or more processors individually or collectively, cause the electronic apparatus to:
obtain a priority of a plurality of types of information included in the information related to the first external device; and
based on the at least one second external device comprising a plurality of second external devices, identify one second external device from among the plurality of second external devices that includes a detection resource corresponding to a type having a highest priority.

5. The electronic apparatus of claim 3, wherein the one or more computer programs further include computer-executable instructions that, when executed by the one or more processors individually or collectively, cause the electronic apparatus to:

based on the at least one second external device comprising a plurality of second external devices, identify one second external device from among the plurality of second external devices that is located closest to the first external device.

6. The electronic apparatus of claim 1, wherein the information related to the first external device includes information on sound generated while the user manipulates the first external device, information on an image capturing the first external device, information on a movement of the first external device, information on light output from the first external device, and information on an odor generated from the first external device, and wherein the one or more computer programs further include computer-executable instructions that, when executed by the one or more processors individually or collectively, cause the electronic apparatus to:

identify the user input by comparing the information related to the first external device with information pre-stored in the memory.

7. The electronic apparatus of claim 1, wherein the one or more computer programs further include computer-executable instructions that, when executed by the one or more processors individually or collectively, cause the electronic apparatus to:

based on the information related to the first external device not being received from the second external device within a threshold time, control the communication interface to transmit, to the second external device, a control signal for controlling the second external device to stop obtaining the information related to the first external device.

8. The electronic apparatus of claim 1, further comprising:

a display, wherein the one or more computer programs further include computer-executable instructions that, when executed by the one or more processors individually or collectively, cause the electronic apparatus to:

based on the sensed predetermined event, control the display to output a notification message notifying a disconnection of communication between the electronic apparatus and the first external device and a start of collection of information related to the first external device.

9. A method performed by an electronic apparatus, the method comprising:

sensing, by the electronic apparatus, a predetermined event related to a first external device for controlling the electronic apparatus, the first external device being a first type device different from a type of device of the electronic apparatus;

based on the sensing of the predetermined event, identifying, by the electronic apparatus, at least one second external device for obtaining information related to the first external device, the at least one second external device being at least one second type device different from the first type device of the first external device and the type of device of the electronic apparatus;

receiving, by the electronic apparatus from the at least one second external device, information related to the first external device, the information related to the first external device including information detected by the at least one second external device while a user manipulates the first external device;

identifying, by the electronic apparatus, a user input of manipulating the first external device based on the information related to the first external device; and performing, by the electronic apparatus, a function of the electronic apparatus based on the user input.

10. The method of claim 9, wherein the predetermined event includes an event in which a communication connection between the electronic apparatus and the first external device is released and an event in which a remaining battery level of the first external device becomes less than a threshold value.

11. The method of claim 9, wherein the identifying of the at least one second external device comprises:

identifying, by the electronic apparatus, a detection resource included in a plurality of external devices communicatively connected to the electronic apparatus; and identifying, by the electronic apparatus, the at least one second external device including a detection resource corresponding to the information related to the first external device from among the plurality of external devices.

12. The method of claim 11, wherein the identifying of the at least one second external device further comprises:

obtaining, by the electronic apparatus, a priority of a plurality of types of information included in the information related to the first external device; and based on the at least one second external device comprising a plurality of second external devices, identifying, by the electronic apparatus, one second external device from among the plurality of second external devices that includes a detection resource corresponding to a type having a highest priority.

13. The method of claim 11, wherein the identifying of the at least one second external device further comprises:

based on the at least one second external device comprising a plurality of second external devices, identifying, by the electronic apparatus, one second external device from among the plurality of second external devices that is located closest to the first external device.

14. The method of claim 9, wherein the information related to the first external device includes information on sound generated while the user manipulates the first external device, information on an image capturing the first external device, information on a movement of the first external device, information on light output from the first external device, and information on an odor generated from the first external device, and wherein the identifying of the user input comprises identifying, by the electronic apparatus, the user input by comparing the information related to the first external device with information pre-stored in a memory.

15. The method of claim 9, further comprising:

based on the information related to the first external device not being received from the second external device within a threshold time, transmitting, by the electronic apparatus to the second external device, a control signal for controlling the second external device to stop obtaining the information related to the first external device.

16. One or more non-transitory computer-readable storage media storing one or more computer programs including computer-executable instructions that, when executed by one or more processors of an electronic apparatus individually or collectively, cause the electronic apparatus to perform operations, the operations comprising:
- sensing, by the electronic apparatus, a predetermined event related to a first external device for controlling the electronic apparatus, the first external device being a first type device different from a type of device of the electronic apparatus;
- based on the sensing of the predetermined event, identifying, by the electronic apparatus, at least one second external device for obtaining information related to the first external device, the at least one second external device being at least one second type device different from the first type device of the first external device and the type of device of the electronic apparatus;
- receiving, by the electronic apparatus from the at least one second external device, information related to the first external device, the information related to the first external device including information detected by the at least one second external device while a user manipulates the first external device;
- identifying, by the electronic apparatus, a user input of manipulating the first external device based on the information related to the first external device; and
- performing, by the electronic apparatus, a function of the electronic apparatus based on the user input.

17. The one or more non-transitory computer-readable storage media of claim 16, wherein the predetermined event includes an event in which a communication connection between the electronic apparatus and the first external device is released and an event in which a remaining battery level of the first external device becomes less than a threshold value.

18. The one or more non-transitory computer-readable storage media of claim 16, wherein the identifying of the at least one second external device comprises:
- identifying, by the electronic apparatus, a detection resource included in a plurality of external devices communicatively connected to the electronic apparatus; and
- identifying, by the electronic apparatus, the at least one second external device including a detection resource corresponding to the information related to the first external device from among the plurality of external devices.

19. The one or more non-transitory computer-readable storage media of claim 18, wherein the identifying of the at least one second external device further comprises:
- obtaining, by the electronic apparatus, a priority of a plurality of types of information included in the information related to the first external device; and
- based on the at least one second external device comprising a plurality of second external devices, identifying, by the electronic apparatus, one second external device from among the plurality of second external devices that includes a detection resource corresponding to a type having a highest priority.

20. The one or more non-transitory computer-readable storage media of claim 18, wherein the identifying of the at least one second external device further comprises:
- based on the at least one second external device comprising a plurality of second external devices, identifying by the electronic apparatus, one second external device from among the plurality of second external devices that is located closest to the first external device.

* * * * *